United States Patent
Yang et al.

(10) Patent No.: US 10,243,998 B2
(45) Date of Patent: Mar. 26, 2019

(54) METADATA SUPPORTING CYBER CONTENT SHARING AND GOVERNANCE AND APPLICATION METHOD THEREOF

(71) Applicant: SOUTHEAST UNIVERSITY, Nanjing (CN)

(72) Inventors: Peng Yang, Nanjing (CN); Youping Li, Nanjing (CN); Hao Yin, Nanjing (CN); Yongqiang Lv, Nanjing (CN); Changjiang Zhang, Nanjing (CN); Bin Zheng, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 15/560,987

(22) PCT Filed: Sep. 9, 2016

(86) PCT No.: PCT/CN2016/098511
§ 371 (c)(1),
(2) Date: Sep. 22, 2017

(87) PCT Pub. No.: WO2018/040120
PCT Pub. Date: Mar. 8, 2018

(65) Prior Publication Data
US 2018/0255103 A1 Sep. 6, 2018

(30) Foreign Application Priority Data
Aug. 30, 2016 (CN) .......................... 2016 1 0785180

(51) Int. Cl.
*H04L 29/06* (2006.01)
*G06F 16/955* (2019.01)
(Continued)

(52) U.S. Cl.
CPC .............. *H04L 63/20* (2013.01); *G06F 16/00* (2019.01); *G06F 16/955* (2019.01); *H04L 63/08* (2013.01); *H04L 67/1097* (2013.01)

(58) Field of Classification Search
CPC ....................................................... H04L 63/20
See application file for complete search history.

(56) References Cited

U.S. PATENT DOCUMENTS

| 9,104,683 B2 * | 8/2015 | Bubash ............. G06F 17/30123 |
| 2007/0086665 A1 * | 4/2007 | Kim ................... G06F 17/30038 |
| | | 382/239 |

(Continued)

OTHER PUBLICATIONS

Kalker, Ton, et al. "Music2Share-copyright-compliant music sharing in P2P systems." Proceedings of the IEEE 92.6 (2004): 961-970. (Year: 2004).*

*Primary Examiner* — Shawnchoy Rahman
(74) *Attorney, Agent, or Firm* — CBM Patent Consulting, LLC (57) ABSTRACT

A method for identifying metadata for cyber content sharing and governance (abbreviated as an MDCCSG method) and application method thereof. The MDCCSG method is proposed based on the requirements of big data sharing and governance under a big data and pan media environment, and is applicable for generating unified identifications on various categories of content resources; and the application method matched with the MDCCSG method can effectively support high-efficient sharing and governance of the big data, wherein the MDCCSG method comprises a unified description framework of metadata, a unified specification method of metadata, and a definition of the core MDCCSG identification element; and the MDCCSG method not only can describe rich semantics of contents in detail, but also has a built-in content trust authentication and security assurance ability.

7 Claims, 2 Drawing Sheets

(51) Int. Cl.
  *G06F 16/00*  (2019.01)
  *H04L 29/08*  (2006.01)

(56) References Cited

U.S. PATENT DOCUMENTS

2013/0232576 A1* 9/2013 Karnikis ................ G06F 21/56
                                                            726/24
2016/0147814 A1* 5/2016 Goel ................ G06F 17/30368
                                                            707/600

* cited by examiner

METADATA SUPPORTING CYBER CONTENT SHARING AND GOVERNANCE AND APPLICATION METHOD THEREOF

This application is the U.S. national phase of International Application No. PCT/CN2016/098511 filed on 30 Aug. 2016 which designated the U.S. and claims priority to Chinese Application Nos. CN201610785180.8 filed on 9 Sep. 2016, the entire contents of each of which are hereby incorporated by reference.

TECHNICAL FIELD

The present invention relates to a content metadata identification method supporting cyber content sharing and governance and an application method, which can enhance the efficiency of content big data sharing and promote the governance of cyber content in big data and pan-media environment, belonging to the field of Internet and information technologies.

BACKGROUND

With the rapid development of Internet technologies and applications and the growth of network users, content distribution and sharing characterized by pan-media and massiveness is becoming a mainstream of Internet application development, and big data trends of cyber content are becoming increasingly prominent. Convenience and ubiquity of content distribution urges the content big data in Cyberspace to appear such characteristics as complex, heterogeneous, uneven and disorder, which is difficult to tackle with. Countries all over the world are actively searching for effective techniques to respond to the severe challenges brought by pan-media and content big data. The Second World Internet Conference convened in Wuzhen proposed a development concept of "An Interconnected World Shared and Governed by All", stressing to promote the changes of the Internet globally through sharing and governance. The core goal of the sharing and governance of the Interconnected World is the sharing and governance of content big data on the Internet. As the continuous updating content big data in Internet is abundant, unstructured (semi-structured) and highly heterogeneous, the key to sharing and governing the content big data is to innovate the content metadata identification method.

Traditionally, Internet mainly employs Uniform Resource Locator (URL) to identify the sources in Internet, but typically it can only represent the location of the content resources, so the difficulty to describe the rich semantics of the content results in many disadvantages of content resources, such as difficulty for searching and governing, confusion and disorder. Some other content identification methods such as Digital Object Identifier and the content identifiers proposed by Information-Centric Networking including hierarchical content identifiers (e.g., TRIAD, CCN and NDN), flat content identifiers (e.g., DONA, PSIRP and NetInf) and property information-based content identifiers (e.g., CBCB), in general, have a feeble ability to describe the semantics and management information of the content, so that requirements for sharing and governance of content big data in Cyberspace is hard to deal with. Additionally, Doublin Core Metadata Element Set (Dublin Core) is influential in the world in recent years and it has developed into a universal content metadata associated with Uniform Resource Identifier (URI), however, 15 core metadata elements in Dublin Core are originated from the digital "library card catalog" which is insufficient for sharing and governing of content big data in Cyberspace. So it is urgent to invent an innovative content metadata identification method capable of supporting sharing and governance of content big data in a big data and pan-media environment, and accordingly propose an application method for effectively supporting high-efficiency sharing and governance of the content big data.

SUMMARY

Invention Purpose: The present invention provides a content metadata identification method supporting cyber content sharing and governance and an application method hereof against the problems in prior art, and the content metadata identification method is applicable to generate unified identifiers on various categories of content resources; the content metadata identification method not only can describe rich semantics of contents in details, but also has a built-in ability to provide content authentication and security assurance; based on the content metadata identification method, various content sharing and governance applications can be developed, and many important functions can be effectively supported to significantly promote the performance and level of cyber content sharing and governance, including efficient content aggregation and distribution, personalized active serving, semantics-based deep analysis, authentication and registration, law-based source traceability and responsibility investigation and the like.

Technical Scheme: A content metadata identification method supporting cyber content sharing and governance and an application method hereof, different from conventional methods, are disclosed according to the requirements of content big data sharing and governance in big data and pan-media environment, and can effectively compensate for deficiencies existing in rich semantic description, efficient distribution and sharing, authentication and security assurance, and governance etc. for content big data in Cyberspace. The content metadata identification method firmly associates the provider, the consumer with the governor of the sharing content by means of a unified content metadata description framework and a specification method to form an innovative content-centric metadata identification system, and the present invention is called MDCCSG (Metadata for Cyber Content Sharing and Governance) method. The application method associated with the content metadata identification method is applicable to develop various content sharing and governance applications, and can effectively support the sharing and governance of content big data in Cyberspace.

A content metadata identification method supporting cyber content sharing and governance proposed by the present invention mainly comprises three parts: a unified description framework of content metadata, a unified specification method of the MDCCSG metadata, definition of core MDCCSG identification elements. They will be described specifically as below:

1) A unified description framework of content metadata. Focusing on the requirements of content big data sharing and governance in a big data and pan-media environment, the MDCCSG method employs a unified description framework to identify the content metadata, and this description framework generates a content metadata identification with a unified format (referred to an MDCCSG identification) for each content resource to be identified, which comprises two parts: MDCCSG identification short code and MDCCSG property information.

The MDCCSG identification short code with a normal length of 32 bytes lies in front of the whole MDCCSG identification and consists of a plurality of fields. These fields store several key information description codes (called as basic short code) associated with the content. Additionally, the MDCCSG identification short code may contain an extension part, which is an extended information description code (called as extension short code) with a length of an integral multiple of 16 bytes (i.e. 16B×n, n=1, 2, 3 . . . ) used for storing the extended fields in addition to the basic short code. The basic short code and the extension short code are collectively referred to as MDCCSG identification short code.

The MDCCSG property information is immediately after the MDCCSG identification short code and includes a plurality of metadata set units (MDSUs), each including a plurality of metadata elements (MDEs). And each MDE describes one property information associated with the identified content. The MDCCSG property information has two compulsory key metadata set units: a description information set unit (DISU) and a management information set unit (MISU). Wherein the DISU focuses on describing the basic properties and semantic information of the content; while the MISU focuses on describing the important property information associated with the content management and governance in Cyberspace.

2) A unified specification method for the MDCCSG metadata. Based on the unified description framework of content metadata, the MDCCSG method especially focuses on high efficiency and flexibility of the encoding for the content metadata identification and the rigorousness and unity of the specification format. It comprises:

(1) A high-efficient and flexible content metadata encoding. In order to improve the distributing and processing efficiency of the content metadata in network environment, the MDCCSG method doesn't utilize XML-based encoding which is widely used in traditional identification techniques, instead, employs different efficient encodings for MDCCSG identification short code and MDCCSG property information respectively. For MDCCSG identification short code, 32 bytes are fully utilized to define the bit-based content metadata information and a plurality of key fields described by binary integers are used for describing the semantics and security information about the content especially those information facilitating to provide quick guide, filtering, interesting matching and personal recommendation for the content users. For MDCCSG property information, a plurality of metadata elements (MDEs) are classified and collected by metadata set unit (MDSU); and each MDSU and MDE is coded respectively in unified format with necessary parsing information to ensure the encoding is simple, compact and easy to parse, and memory saving. At the same time, the flexibility and scalability of the MDCCSG identification are also ensured by means of reservation and on-demand expansion.

(2) A rigorous and unified content metadata specification format. The MDCCSG method can identify all categories of content resources, and all the resulted MDCCSG identifications follow a unified format standard, such that the MDCCSG identifications can be effectively collected and aggregated to form an MDCCSG identification space of cyber content big data. And, in each MDCCSG identification, the specification formats of metadata information with common features are classified for refinement to ensure that a minimum number of categories are used, and these categories are defined rigorously and normally to allow each category to follow a unified format and description style.

The main specification format of the MDCCSG identification is divided into four categories: a field in MDCCSG identification short code specified by binary integer in bits; a metadata set unit (MDSU) header with a length of 5 to 8 bytes mainly specifying type number of the MDSU, number of metadata elements (MDEs), total length of all MDEs, MDE Quick Matcher and the like; a metadata element (MDE) header with a length of 3 to 6 bytes mainly specifying type number of the MDE, number of members, MDE body length and the like; a body of metadata element (MDE) occupying many bytes that describe the specific value of the MDE itself. And the header of MDCCSG property information also utilizes a specification format similar to the MDSU header.

3) Definition of core MDCCSG identification elements. The MDCCSG method considers the subject demands of the content provider, user and sharing governor and the like simultaneously, and selects a plurality of core content metadata identification elements (referred to as MDCCSG identification elements or identification elements for short). The MDCCSG identification elements cover information of the content such as semantic description, trust authentication and security assurance, and supports functions of "dual signature mechanism" and "multi-level authentication and registration+source tracing and responsibility investigation"; therefore, this method is significantly different from other existing metadata identifying methods. It specifically comprises:

(1) Core identification elements for MDCCSG identification short code. The first key identification element of this part is Version, occupying 3 bits, and used to describe the version number of the MDCCSG identification. The current version number is 001 (wherein 000 is reserved), indicating Version v1. In Version v1, the core identification elements of the MDCCSG identification short code further comprise: Type of Media (occupying 5 bits), Precedence (occupying 4 bits), Flag (occupying 4 bits), Parse Rule (occupying 12 bits), Source (occupying 28 bits), Category (occupying 8 bits), Subcategory (occupying 8 bits), Topic (occupying 32 bits), Content Type (occupying 8 bits), Copyright & Originality (occupying 8 bits), Security EL Code (occupying 8 bits), Timestamp in Seconds (occupying 40 bits), Timestamp in Milliseconds (occupying 10 bits), Serial No. (occupying 22 bits), Checksum (occupying 16 bits) and the like. Furthermore, additionally, 6 bytes are reserved before the Checksum and after the Serial No.

(2) Core identification elements for MDCCSG property information. This part utilizes metadata set unit (MDSU) to classify and collect the MDCCSG identification elements, wherein there exist are mainly three categories of MDSUs: description information set unit (DISU), management information set unit (MISU) and extension information set unit (EISU), in which DISU and MISU are compulsory identification items. The core identification elements collected by DISU comprises: Title, Keyword, Abstract, Author, Entity, Copyright, File Description and the like; the core identification elements collected by the MISU comprises: Physical Elements, Provenance, Content ID, Propagation Path, Signature of Content, Security EL Info, Chain of Responsibility, Signature of Whole MDCCSG and the like. Each core identification element is a metadata element (MDE) having an MDE header of same format, and the defining the position, sequence and type number and the like of these core identification elements are specified.

(3) Core identification elements supporting trust authentication and security assurance. Compared with the traditional identification method, the MDCCSG method is mostly characterized in that it gives a built-in support to the content based trust authentication and security assurance, and it innovatively introduces the concept of security energy level (EL) in light of the Energy Level of the electron, and embodies this security energy level concept in the MDCCSG identification. The core identification elements associated with this characteristic mainly comprise: Security EL Code (simplified description of Security EL Info) in the MDCCSG identification short code, and Physical Elements, Signature of Content, Security EL Info, Chain of Responsibility, Signature of Whole MDCCSG and the like in the MDCCSG property information. Wherein the Physical Elements collectively describes such information in physical dimension as "time, space, person, thing, object"; and the Signature of Content and Signature of Whole MDCCSG support "dual signature mechanism" which ensures the data integrity and credibility of signer identity on two levels (the content itself and the whole MDCCSG identification); the Security EL Code and Security EL Info describe the quality properties of the contents (e.g. safety, credibility, influence etc.); the Chain of Responsibility can provide source traceability and responsibility investigation. By combining these identification elements, functions of "multi-level authentication and registration+source traceability and responsibility investigation" can be achieved while supporting the requirements of content big data sharing and governance.

An application method of content metadata identification supporting cyber content sharing and governance, based on the MDCCSG identification, is applicable for developing content sharing and governance applications for group users in Cyberspace. Both high-efficient sharing and governance of content big data can be achieved based on MDCCSG identification. The application method will be described specifically as below:

(1) Achieving high-efficient content sharing based on MDCCSG identifications. In content sharing applications, corresponding MDCCSG identifications are firstly established for all the contents and then all the MDCCSG identifications are distributed to all the content user terminals by one-to-many transmission mode. A processing system at each user terminal matches the MDCCSG identification in two steps according to the interests of users: first step, matching quickly according to the fields of Source, Category, Subcategory, Topic and the like in the MDCCSG identification short code to complete the primary filtering of the massive MDCCSG identifications; second step, further combining the fields of Title, Keyword, Abstract, Author, Entity, Copyright, Originality, File Description and the like in the MDCCSG property information from the primarily filtered MDCCSG identifications to complete the semantics-based deep analysis, personalized interest matching, and intelligent recommendation. The active service efficiency of content sharing application can be significantly improved from the aspects of distribution efficiency, analysis efficiency, filtering efficiency, and recommendation efficiency.

(2) Achieving content governance based on MDCCSG identifications. In content-governance applications, typically an authoritative content governance center processing system (a center process system for short) is generally pre-installed. First, the center processing system aggregates all the contents within and associated with the application and collectively organizes and governs the MDCCSG identifications of these contents to form an MDCCSG identification space covering all the aggregated contents. The contents are mainly aggregated in two manners: in a first manner, the center processing system actively aggregates the contents through the Internet, which is referred to as an active collecting manner; in a second manner, the content provider and its superior governance organization register the content to the center processing system in a level-by-level authentication manner, which is referred to as an authentication and registration manner.

For the content collected by the active collecting manner, its MDCCSG identification is generated by the center process system; for that collected by the authentication registration way, its MDCCSG identification is typically generated by the content provider and its superior governance organization, and level-by-level authentication and registration is performed on the MDCCSG identification, till the MDCCSG identification is eventually authenticated and registered by the central processing system. During this process, the center processing system may label the source, trustworthy, importance, together with information such as path of propagation, responsibility subject, into the MDCCSG identification by means of digital signature and in aid of the MDCCSG identification space. Then, the MDCCSG identification to be distributed are delivered to the user terminal by one-to-many transmission mode. After the user receives the MDCCSG identification, the authenticity, credibility, influence of the contents can be determined through the fields of Security EL Info and Security EL Code; whether the original content and MDCCSG identification being tampered can be distinguished through the fields of Signature of Content and Signature of Whole MDCCSG; law-based source traceability and responsibility investigation for the content can be done through the fields of Propagation Path, Chain of Responsibility, Signature of Whole MDCCSG, etc.

It should be noted that various content-centered centric complex applications can be designed and developed by the MDCCSG method. In these applications, the above two application approaches for the MDCCSG identification serve as a basis and are often used cooperatively to commonly improve content sharing performance and governance ability of the applications.

Beneficial effects: Compared with prior art, the present invention has such advantages as below:

1. The present invention is disclosed according to the requirements of content big data sharing and governance in a big data and pan media environment. It employs a unified content metadata description framework and a unified specification format to create unified identifications on various content resources and thus obtains universal MDCCSG identifications, wherein the encoding is highly efficient and flexible and the specification format is rigorous and unified.

2. The entire content metadata identification is formed by combing the MDCCSG identification short code and MDCCSG property information, wherein the core identification elements simultaneously covers such information as semantic description, content security and reliability, and considers the subject demands of providers, users and governors of the sharing contents in all-round way, so as to be able to provide built-in support for content trust authentication and safety guarantee and the like, thereby this method is significantly different from existing identification methods.

3. Based on this identifying method, various content-centric complex applications can be developed, and high-efficient aggregation and distribution, personalized active serving, semantics-based deep analysis, authentication and registration, source tracing and responsibility investigation according to laws and the like on content big data can be effectively supported, while content sharing performance and governance level of applications can be significantly improved.

DETAILED DESCRIPTION

The invention will be further described in detail in combination with following drawings and the specific embodiments. It should be understood that these embodiments are merely used for illustrating the present invention and not for limiting the scope of the present invention. Various equal modifications made by those skilled in the art after reviewing the present invention are within the scope of the claims.

Figure 1:
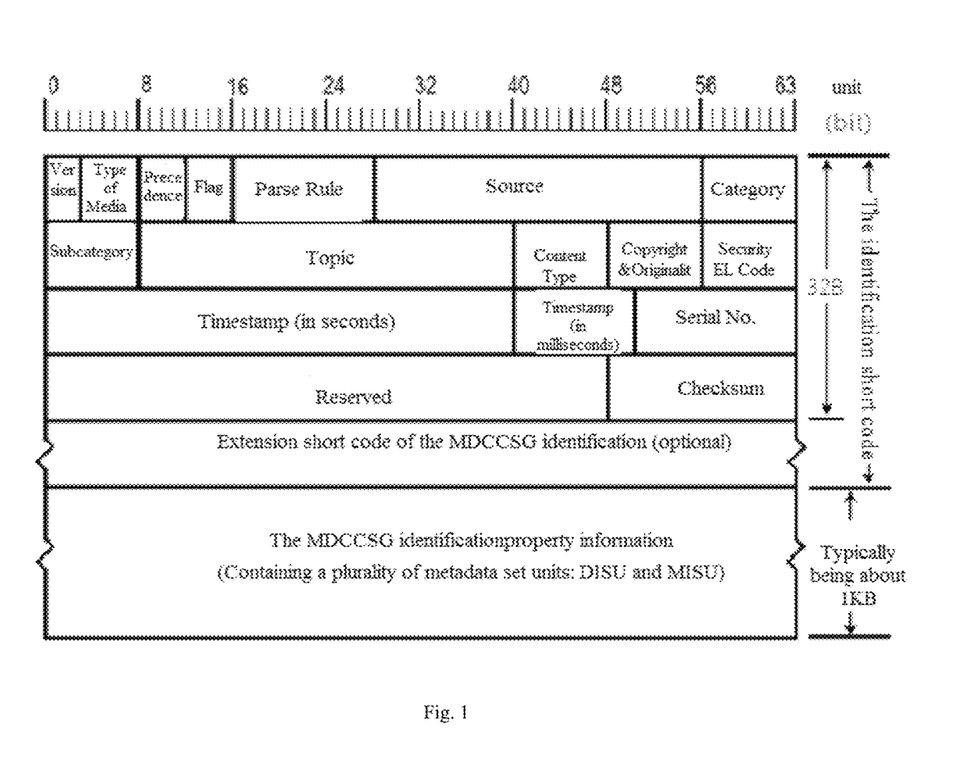
FIG. 1 is the specific description framework of the content metadata used by the present invention, focusing on describing the MDCCSG identification short code.

A content metadata identification method supporting cyber content sharing and governance (abbreviated as MDCCSG method) is disclosed according to the requirements of content sharing and governance in a big data and pan media environment, and is applicable to create unified identifications on various categories of content resources; the application method matched with the identification method can be used to develop group user-oriented content sharing and governance applications in Cyberspace. The MDCCSG method mainly comprises three parts: a unified description framework of the content metadata, a unified specification method of the metadata, and definition of core MDCCSG identification elements. The detailed description of the embodiments is as follows:

1. A unified description framework of content metadata. As shown in FIG. 1, the MDCCSG method generates a unique MDCCSG identification for each content. The MDCCSG identification comprises two parts: MDCCSG identification short code and MDCCSG property information, wherein the MDCCSG identification short code is a fixed-length part of the MDCCSG identification and located in front of the entire MDCCSG identification. Typically, the MDCCSG identification short code only includes a basic short code with a normal length of 32 bytes; and the basic short code (32 bytes) may be followed by an extension short code with a length of integer multiple of 16 bytes only when it is necessary for application, and the extension short code still belongs to the MDCCSG identification short code.

Figure 2:
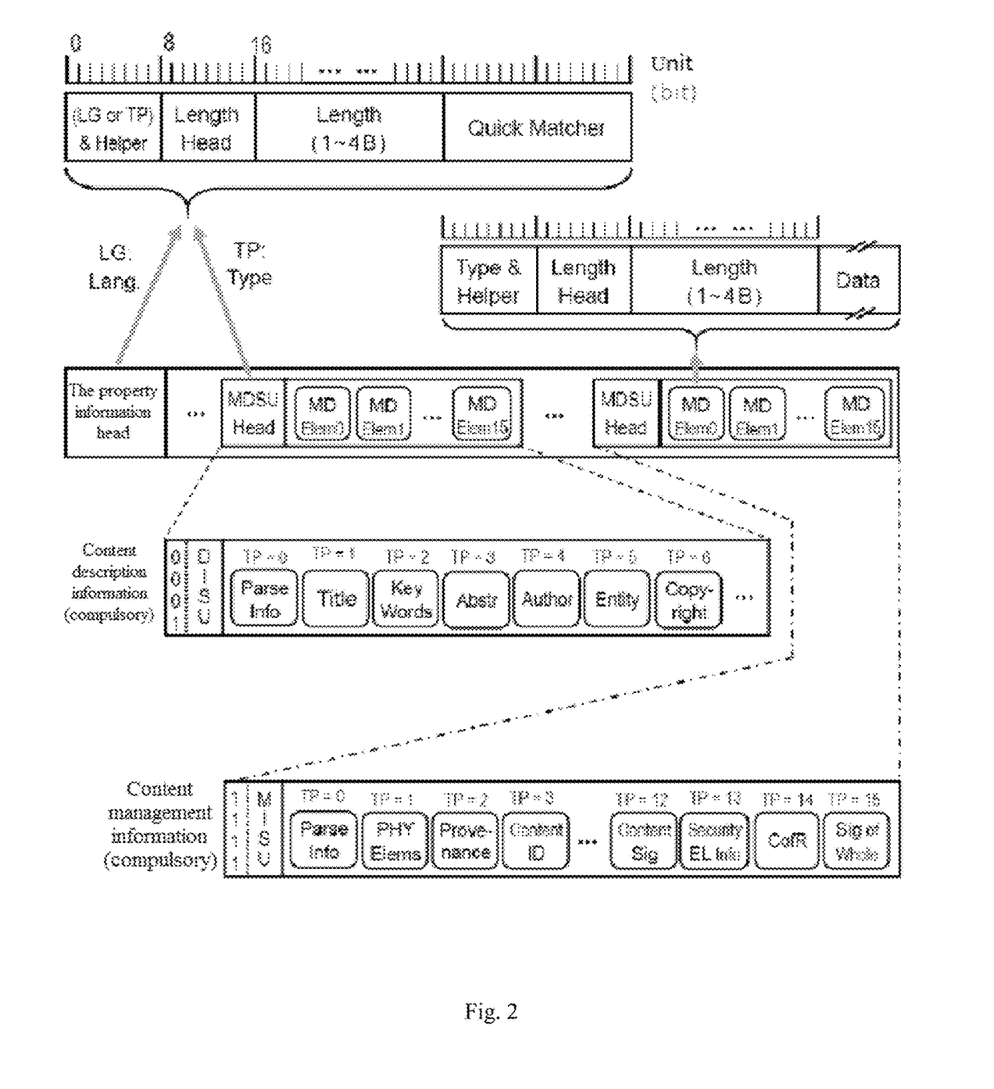
FIG. 2 is a specific specification format of the MDCCSG property information in an MDCCSG identification.

The MDCCSG property information is a flexible and variable-length part of the MDCCSG identification, and is located after the MDCCSG identification short code. Specific description framework for MDCCSG property information is shown in FIG. 2. The MDCCSG property information is a container that can contain 2 to 16 metadata set units (MDSU). Each metadata set unit is also a container that can contain 1 to 16 metadata elements (MDE). Typically, the MDCCSG property information only includes two compulsory key metadata set units: a description information set unit (DISU) and a management information set unit (MISU). The DISU mainly describes the basic property and semantic information of the content; The MISU describes the property information associated with the content governance, especially content trust authentication and security assurance information.

2. A unified specification method of the content metadata. To lead the network content big data to achieve highly-efficient distribution and sharing, the MDCCSG method requires the MDCCSG identification to be simple and compact, normative and rigorous and easy for parsing, to contain necessary metadata identification information while having its normal length of about 1 kilobyte (KB). Thus, the MDCCSG identification focuses on employing highly-efficient and flexible encoding and rigorous and unified specification formats. The MDCCSG method does not use the XML-based encoding of conventional content identifications, instead, utilizes binary integer to describe a plurality of key fields in the MDCCSG identification short code, as shown in FIG. 1, for achieving sufficient utilization and compact encoding of 32 bytes. In the MDCCSG property information, container-based classification and collection method is used to ensure simplicity, normalization and rigorousness of encoding and decoding, as shown in FIG. 2. At the same time, the MDCCSG identification also has a flexible extensibility.

The main encoding and specification formats of the MDCCSG identification are divided into four categories: fields in the identification short code, an MDSU header, an MDE header and an MDE body, and the format of the MDSU headerheaderer is similar to that of the MDE header, and the header of the MDCCSG property information is also defined based on the MDSU header. Wherein the field in short code is encoded and regulated by binary integer in bits, as shown in FIG. 1. And the encoding and specification formats of the MDSU header, the MDE header and the MDE body is shown in FIG. 2. In the first byte of the MDSU header and the MDE header, the front 4 bits is used to specify the type number (Type), but in the MDCCSG property information header, the first 4 bits are used to specify the language type (Language) of the MDCCSG identification itself; the last 4 bits are used to specify assisting information (Helper). The major difference between the MDSU header and the MDE header is that a quick-match information (Quick Matcher) of 2 bytes is placed at the end of the MDSU header for quickly indicating what types of MDEs are collected by this MDSU specifically. Of course, if it is the MDCCSG property information header, the quick-match information of 2 bytes in the end is used to quickly indicate what types of MDSUs are collected specifically.

Furthermore, the MDCCSG identification also adheres to several consistency rules and description agreements (see FIG. 2). For example, all the MDSUs and MDEs with type number 0 (i.e. Type=0) are reserved for enabling a user to introduce parse information associated with encoding and decoding on demand to ensure the MDCCSG identification is more flexible; additionally, the type number of DISU being 1 and that of MISU being 15 ensures that the MISU is always the last MDSU of the MDCCSG property information and further ensures the MISU to be able to give digital signature for the whole MDCCSG identification by using its last MDE (i.e. the field of Signature of Whole MDCCSG).

3. Definition of core MDCCSG identification elements. Different from other conventional identification method, the MDCCSG method is characterized in that it covers information of semantics description of content, trust authentication and security assurance to form a universal and standard MDCCSG identification. The MDCCSG method selects and defines several core metadata identification elements (referred to MDCCSG identification elements and identification elements for short) for the MDCCSG identification short code and MDCCSG property information, mainly comprising: (1) core identification elements for MDCCSG identification short code; (2) core identification elements for MDCCSG property information; (3) core identification elements supporting trust authentication and security assurance. Wherein (3) synthesizes (1) and (2) to highlight the concept of security level of MDCCSG identification and functions of content trust authentication and security assurance.

It should be noted that, although the core identifier elements mentioned in the following embodiments mainly follow the definition of MDCCSG identifiers in Version v1, the present invention apparently includes similar modifications inspired by the present invention.

(1) Core Identification Elements for MDCCSG Identification Short Code (See FIG. 1)

Version: occupying 3 bits, used for describing the version number of an MDCCSG identification, and the current version number is 001 (wherein 000 is reserved) that indicates Version v1 of the MDCCSG identifications.

Type of Media: occupying 5 bits, and used for describing the media type of the content.

Precedence: occupying 4 bits, and used for describing the priority and urgency of the content.

Flag: occupying 4 bits, and used for indicating whether information such as extension short code follows.

Parse Rule: occupying 12 bits, and used for indicating the rule adhered by the MDCCSG identification.

Source: occupying 28 bits, and used for describing the source information of the content.

Category: occupying 8 bits, and used for describing the category to which the content belongs.

Subcategory: occupying 8 bits, and used for describing the subcategory to which the content belongs.

Topic: occupying 32 bits, used for describing the topic information involved by the content.

Content Type: occupying 8 bits, and used for describing the language and type information of the content (e.g. audio, video, text, figure, new media etc.).

Copyright & Originality: occupying 8 bits, and used for describing whether the content has a copyright notice and originality.

Security EL Code: occupying 8 bits, and used for describing information of the content in regard to authentication level, security, trust, influence.

Timestamp in Seconds: occupying 40 bits, and used for describing the elapsing seconds from a start time point to the timestamp extraction time point in a given time system standard (GPS, Beidou, POSIX, etc.).

Timestamp in Milliseconds: occupying 10 bits, and used for describing the millisecond-level precision timestamp within the second recorded by the field of Timestamp in Seconds.

Serial No.: occupying 14 bits, and used for describing the allocated serial number when the MDCCSG identification is registered. The serial number must be used in combination with Timestamp in Seconds and Timestamp in Milliseconds.

Checksum: occupying 16 bits, and used for describing the checksum of remaining 30 bytes after removing the field of Checksum (2 bytes) in the basic short code of the MDCCSG identification short code (32 bytes).

(2) Core Identification Elements for MDCCSG Property Information (See FIG. 2)

The MDCCSG property information must have two metadata set units (typically only including these two metadata set units): a content description information set unit (DISU, its type number is 1) and a content management information set unit (MISU, its type number is 15), and each has core identification elements as below.

Core identification elements for the content description information set unit (DISU) mainly include (the following type numbers refer to those inside DISU):

Title: the allocated type number is 1, and used for describing the header line or title information of the content.

Keyword: the allocated type number is 2, and used for describing several words or phrases reflecting the theme or summary of the content.

Abstract: the allocated type number is 3, and used for describing summary information reflecting the theme, main idea and subject of the content.

Author: the allocated type number is 4, and used for describing the creator or organization information of the content.

Entity: the allocated type number is 5, and used for describing "5W"-based named entity information, including who, when, where, what, why.

Copyright: the allocated type number is 6, and used for describing the copyright information associated with the content, which typically contains various copyright statements, such as intellectual property right statement.

Originality: the allocated type number is 7, and used for describing whether the content is an originality and the specific originator (or organization).

File Description: the allocated type number is 8, and mainly used for describing the type, format, and size of the file of the content.

Core identification elements for content management information set unit (MISU) mainly include (the following type numbers refer to those inside MISU):

Physical Elements: the allocated type number is 1 and is used for describing the physical dimension information associated with the creation, transmission and reception of the content.

Provenance: the allocated type number is 2, and used for describing the original source information of the content.

Content ID: the allocated type number is 3, and used for describing the identification that conform to other standard systems related to the content, such as uniform resource identifier (URI), digital object identifier (DOI) etc.

Propagation Path: the allocated type number is 4, and used for describing the path information of the content during its transmission.

Signature of Content: the allocated type number is 12, and used for storing the digital signature information of the content itself.

Security EL Info: the allocated type number is 13, and used for describing the quality property information of the content itself (e.g. security, trust, influence etc.).

Chain of Responsibility: the allocated type number is 14, and used for describing the responsibility subject information for each level during a multi-level authentication and registration process of the content.

Signature of whole MDCCSG: the allocated type number is 15, and used for storing the digital signature information of the whole MDCCSG identification.

(3) Core Identification Elements Supporting Trust Authentication and Security Assurance (See FIG. 1 and FIG. 2)

Significantly different from conventional identification method, the MDCCSG method can both describe the rich semantics information of content and provide a built-in support for content trust authentication and safety guarantee as well as introduce the concept of security energy level originally. The MDCCSG method particularly adds several core identification elements for content security and trustworthiness, which are embodied in both the MDCCSG identification short code and MDCCSG property information. Wherein it is mainly shown as the field of Security EL Code in the MDCCSG identification short code; and in the MDCCSG property information, they are shown as Physical Elements, Signature of Content, Security EL Info, Chain of Responsibility and Signature of Whole MDCCSG, etc.

The Security EL Code is a simplified description of the Security EL Info, mainly used to indicate such information as authentication level, security, trust, and influence for the users, which is simple but necessary and helps the content user assume secure and rational strategies for reading and accepting. The Physical Elements mainly focus on describing the physical dimension information that are involved in the creation, transmission and receiving of a content. The physical dimension information mainly comprise: time (absolute time), space (longitude, latitude, height in navigation or positioning), person (electronic identity information of authorized person), thing (related specific thing), and object (related hardware device information).

Cooperation of the Signature of Content and the Signature of Whole MDCCSG shows the feature of "dual-signature mechanism" of the MDCCSG identification: ensuring the data integrity (prevent from being tampered) and signer identity trust (cannot be denied) of the content itself and the whole MDCCSG identification. The quality properties of content described mainly by the Security EL Info comprise security authentication level, authenticity, one-sidedness, influence degree and range of the content. Cooperation of the Chain of Responsibility and the Signature of Whole MDCCSG Identification embodies the feature of "multi-level authentication and registration+source traceability and responsibility investigation" of the MDCCSG identification: during the process of multi-level authentication registration, the responsibility subject at each level adds its identity information into the Chain of Responsibility and then generates the Signature of Whole MDCCSG Identification; next, once a content needs responsibility investigation, only the Chain of Responsibility is needed to be checked for determining level-by-level which subjects should take responsibility.

An application method of the content metadata supporting cyber content sharing and governance is a matching application method of the MDCCSG identifications. It is applicable for establishing cyber content sharing and governance applications for group users in Cyberspace, and high-efficiency sharing and governance of content big data can be effectively supported. The application methods of MDCCSG identifications are exemplified below by using two types of typical applications, however, it should be noted that in normal sharing and governance applications of content big data, these two application methods are usually inseparable and need to be used cooperatively.

(1) Achieving High-Efficient Content Sharing Based on MDCCSG Identifications

Assuming that a certain Internet content provider (ICP) builds a news push application facing group users and that an application APP capable of process MDCCSG identification has been installed at the terminals of users, the APP having functions of user customization, interest perception, personalized recommendation, etc.

First, the ICP creates corresponding MDCCSG identifications for all news contents. Next, it broadcasts the news contents and their MDCCSG identification to all the terminals of users. After receiving massive and continuously distributed news contents and MDCCSG identifications, the user-side APP firstly conducts, based on the customization information or users' interests perceived by the APP, quick matching according to the fields of Source, Category, Subcategory and Topic in the MDCCSG identification short code to achieve primary filtering of the massive MDCCSG identifications. Then, the APP further combines the fields of Title, Keyword, Abstract, Author, Entity, Copyright, Originality and File Description in the MDCCSG property information to perform deep analysis, personalized precise matching and intelligent recommendation on the filtered MDCCSG identifications and feedback to the user. If the user satisfies the MDCCSG identifications matched with his/her interests or recommended by the APP, the APP will display the corresponding news contents to the user. This can not only ensure the efficiency of news distribution and process for group users but also meet the personalized requirements of users.

(2) Achieving Content Governance Based on MDCCSG Identifications

The following is a typical but relatively simplified content governance application scenario. Assuming that a public opinion governance organization is responsible for governing several ICPs, and each ICP governs several content creators (CCs). The public opinion governance organization develops a public opinion analysis application based on MDCCSG identifications. And assuming that this public opinion analysis application includes an APP capable of processing MDCCSG identifications, and the APP can create a standard MDCCSG identification for each content while having functions of MDCCSG identification check and modification. This APP is pre-installed in the application systems of all the ICPs and CCs.

First, when each CC produces a new content (including professional news content or various self-media content that is labeled as cont), it uses APP simultaneously to create a corresponding MDCCSG identification (labeled as mdi), which includes a signature for the cont made by the CC with its private key, a personal identity information of the CC that is recorded in the field of Chain of Responsibility, and a signature for the whole mdi made by the CC with its private key (referring to the dual-signature for the first time). Next, when issuing the cont, the CC submits the cont and corresponding mdi to its superior governance ICP for authentication and registration. Once received the authentication and registration request from the CC, the ICP will authenticate and check the mdi according to according to information such as the cont by using the APP immediately. If the check is passed, the ICP may re-modify some related information in the mdi and record the identity information of itself into the field of Chain of Responsibility, and then signs the whole mdi by a private key of the ICP itself (referring to the dual-signature for the second time). Next, the ICP submits the cont and the newest mdi to the central process system of the public opinion governance organization for authentication and registration.

Subsequently, the central process system may authenticate and check seriously on the mdi according to its MDCCSG identification space. If the check is passed, the central processing system may re-modify some related information in the mdi and record additionally the identity information of the public opinion governance organization into the field of Chain of Responsibility, and then signs for whole mdi by the private key of the public opinion governance organization itself (referring to the dual-signature for the third time) to complete authentication and registration of the cont and the mdi. If the check is not passed due to the need for tracing responsibility, the central processing system can trace responsibility level-by-level according to laws based on the field of Chain of Responsibility in the mdi. In this way, the "multi-level authentication and registration+ source traceability and responsibility investigation" mechanism based on MDCCSG identifications can be established. Of course, during the above process, deep governance based on semantics and content trust authentication can be performed in combination with the MDCCSG identification space of the central processing system and the fields of Security EL Code and Security EL Info in the mdi by using such existing methods and techniques as knowledge mining, entity linking, and deep learning neural networks.

What is claimed is:

1. A method for identifying metadata for cyber content sharing and governance (abbreviated as MDCCSG method), characterized in that: the MDCCSG method is used for big data sharing and governance in a big data and pan media environment, comprising a unified framework of metadata, a unified specific method of metadata, and a definition of core MDCCSG identification elements, wherein,
   (1) the unified framework of metadata generates a unified metadata identification (referred as an MDCCSG identification) for each content resource to be identified, wherein the MDCCSG identification comprises an MDCCSG identification short code and an MDCCSG property information;
   (2) the unified specific method of metadata adopts different encoding specific formats for the MDCCSG identification short code and the MDCCSG property information, respectively, wherein the specific formats for the MDCCSG identification short code uses 32 bytes to define a bit-based content metadata information and describe a plurality of key fields by binary integers, and especially focuses on content semantics and security information description; the specific formats for the MDCCSG property information classifies and collects a plurality of metadata elements (MDEs) by metadata set units (MDSUs); and guarantees the flexibility and scalability of the MDCCSG identification by reservations and on-demand extension;
   (3) the definition of core MDCCSG identification elements selects a plurality of core content metadata identification elements, including a semantic description information, a trust authentication and security assurance information of the content, and creates a security energy level (EL) identification elements reflecting content quality property at the same time, and supports a "dual signature mechanism" and "multi-level authentication and registration, and source traceability and responsibility investigation" functions.

2. The MDCCSG method according to claim 1, characterized in that: the MDCCSG identification short code lies in front of the whole MDCCSG identification with a standard length of 32 bytes and consists of a plurality of fields, wherein these fields store several key information description codes (referred as basic short codes) associated with the content; the MDCCSG identification short code further has an extension part, wherein the extend part is an extended information description code with a length of an integral times of 16 bytes (referred to an extension short code) used for storing extended fields except the basic short code; the basic short code and the extension short code are collectively called as the MDCCSG identification short code.

3. The MDCCSG method according to claim 1, characterized in that: the MDCCSG property information closely follows the MDCCSG identification short code and includes a plurality of metadata set units (MDSUs); each MDSU including a plurality of metadata elements (MDEs), and each MDE describing one aspect of property information associated with the content; the MDCCSG property information includes two compulsory key metadata set units: a description information set unit (DISU) and a management information set unit (MISU); wherein the DISU focuses on describing the basic properties and semantic information of the content; and the MISU focuses on describing important property information associated with content management and governance in Cyberspace.

4. The MDCCSG method according to claim 1, characterized in that: main specific formats for the MDCCSG identification are divided into four categories: a field in the identification short code, specified by binary integer in bits; a metadata set unit (MDSU) header with a length of 5 to 8 bytes, mainly specifying a type number, number of metadata elements (MDEs), total length of all MDEs, MDE Quick Matcher etc.; a metadata element (MDE) header with a length of 3 to 6 bytes, mainly specifying the type number, number of members, MDE payload length; payload of metadata element (MDE), occupying multiple bytes and describing a specific value of the corresponding MDE; and header of the MDCCSG property information adopts a specific format similar to the MDSU header.

5. The MDCCSG method according to claim 1, characterized in that: the definition of core MDCCSG identification elements specifically comprises:
   (1) the core identification elements of the MDCCSG identification short code, wherein a first key identification element of the core identification elements is the Version, occupying 3 bits, and used to describe the version number of the MDCCSG identification; the core identification elements of the MDCCSG identification short code further comprises Type of Media, Precedence, Flag, Parse Rule, Source, Category, Subcategory, Topic, Content Type, Copyright & Originality, Security EL Code, Timestamp in Seconds, Timestamp in Milliseconds, Serial No., and Checksum; additionally, 6 bytes are reserved in front of Checksum and after Serial No.;
   (2) the core identification elements of the MDCCSG property information, wherein the MDCCSG identification elements are classified and collected using a metadata set unit (MDSU), wherein the MDSU includes a description information set unit (DISU), a management information set unit (MISU) and an extension information set unit (EISU), in which the DISU and the MISU are mandatory identification options; the core identification element collected by the DISU comprises Title, Keyword, Abstract, Author, Entity, Copyright, Originality Clarification, and File Description; the core identification elements collected by the MISU comprise Physical Elements, Priority, Content ID, Propagation Path, Signature of Content, Security EL Info, Chain of Responsibility, and Signature of Whole MDCCSG; each core identification element is a metadata element (MDE) having an MDE header with the same format and defining the position, sequence and type etc. of these core identification elements are specified;
   (3) the core identification elements supporting trust authentication and security assurance, providing a built-in support of trust authentication and security assurance for the content by synthesizing the identification elements in the associated MDCCSG identification, wherein the relevant core identification elements mainly comprise: a Security EL Code (a simplified description of Security EL Info) in the MDCCSG identification short code; a Physical Element, Signature of Content, Security EL Info, Chain of Responsibility, and Signature of Whole MDCCSG in the MDCCSG property information; wherein the Physical Element collectively describes the physical dimension information such as "time, space, person, thing and object"; and the Signature of Content and Signature of Whole MDCCSG support "dual signature mechanism", ensuring the data integrity of the contents and the whole MDCCSG identification, and the credibility of signer identity; and the fields of Security EL Code and Security EL Info describe the quality property of the content itself; the Chain of Responsibility provides source traceability and responsibility investigation; by combining these identification elements, functions of "multi-level authentication registration, and source traceability and responsibility investigation" is achieved while supporting e the requirements of cyber content big data sharing and governance.

6. An application method of MDCCSG identification, characterized in that: the method is applicable for developing group user-oriented content sharing and governance applications in Cyberspace, and supports not only MDCCSG identification-based content sharing applications but also MDCCSG identification-based content governance applications, which are described specifically as below:

(1) achieving a high-efficient content sharing based on the MDCCSG identification, comprising the step of: firstly, building the corresponding MDCCSG identifications for all the contents, and then distributing all the MDCCSG identifications to all user terminals of contents by a one-to-many transmission mode; matching the MDCCSG identification in two steps, by a processing system at each user terminal, according to the interests of users: step 1, performing quick matching according to the MDCCSG identification short code to complete the primary filtering of the massive MDCCSG identifications; step 2, further combining their MDCCSG property information from the primarily filtered MDCCSG identifications to complete a semantics-based analysis, personalized matching, and active recommendation;

(2) achieving a scientific content governance based on the MDCCSG identification comprising the step of: configuring an authoritative central processing system for content governance (abbreviated as a central processing system); firstly, aggregating all the contents within the application and associated fields by the central processing system, and performing centralized organization and management on the MDCCSG identifications of these contents, to form an MDCCSG identification space covering all the aggregated contents; next, for each content submitted for authentication and registration, marking a content source, credibility, importance, along with a propagation path and responsibility subject information, into the MDCCSG identification of the content by the central processing system, by means of digital signature and in aid of the MDCCSG identification space; then, sending the MDCCSG identifications to be distributed to the user terminals by a one-to-many transmission mode; after receiving the MDCCSG identifications, the user determines the authenticity, credibility, and influence of the contents by using fields of content Security EL Info and Security EL Code; distinguishes whether the original content and the MDCCSG identification are tempered by using a Signature of Content and the Signature of Whole MDCCSG; and conducts law-based source traceability and responsibility investigation for the content by using the Propagation Path, Chain of Responsibility, and Signature of Whole MDCCSG.

7. The application method of MDCCSG identification according to claim 6, characterized in that: the aggregating approaches include an active collection method and an authentication and registration approach wherein the active collection method is to collect the contents actively, by the central processing system, through the Internet; and the authentication and registration approach is that the provider of contents and its superior governance organization register the content to the central processing system in a level-by-level authentication;

for a content captured by the active collecting approach, its MDCCSG identification is generated by the central processing system; for a content captured by the authentication and registration approach, its MDCCSG identification is typically generated by the content provider and its superior governance organization, and the MDCCSG identification is authenticated and registered level-by-level till the authentication and registration is processed by the central processing system in the end;

the MDCCSG identification of content must achieve "dual signature mechanism", ensuring the data integrity of contents and non-repudiation of signer identity by using the Signature of Contents; ensuring the data integrity of the whole MDCCSG identification and non-repudiation of signer identity by using the Signature of Whole MDCCSG; furthermore, achieving the functions of "multi-level authentication and registration, and source traceability and responsibility investigation" based on the "dual signature mechanism".

* * * * *